INVENTOR
PETER VER PLANCK

United States Patent Office 3,522,602
Patented Aug. 4, 1970

3,522,602
SYSTEM FOR MEASURING RANGE AND RELATIVE VELOCITY
Peter Ver Planck, Arlington, Mass., assignor to Sylvania Electric Products Inc., a corporation of Delaware
Filed Oct. 30, 1968, Ser. No. 771,774
Int. Cl. G01s 9/04, 9/44, 9/51
U.S. Cl. 343—6.5    12 Claims

ABSTRACT OF THE DISCLOSURE

A system employing a transponder on one object having an antenna terminated in a reflection amplifier, the gain of which modulated at an angular frequency $\omega_m$. When the transponder is illuminated from a second object by a continuous wave carrier signal at an angular frequency, $\omega_c$, a portion of the incident energy is converted into two sidebands at $\omega_c \pm \omega_m$ and reradiated back toward a receiver at the second object. The upper and lower sidebands are both accepted by the receiver, heterodyned with a sample of the transmitted carrier, and the resulting intermediate frequency signal at $\omega_m$ is directed to an amplifier and a detector. To determine the distance between the two objects, the continuous wave carrier signal is swept in frequency, and the frequency separation between the successive nulls in the detector output signal is noted. To determine the relative velocity between the two objects, the frequency $\omega_c$ of the continuous wave carrier signal is held constant, and the number of nulls in the detector output signal are counted over a fixed time interval.

BACKGROUND OF THE INVENTION

This invention relates to range and velocity measuring systems and, in particular, to such systems employing transponders and continuous wave propagation.

Continuous wave systems have employed transponder beacons to receive, frequency translate and retransmit a replica of the transmitted signal. At the transmitter/receiver, the phase delays experienced by various modulation waveforms in passing to the transponder and back are measured and the range is determined from the phase delay.

One conventional system employs a transponder to double the received carrier frequency and retransmit it without phase distortion. This same frequency doubling operation is performed on a sample of the transmitted carrier at the receiver, and the two double-frequency signals are heterodyned to derive the Doppler frequency.

Other transponders offset the original modulated transmitted carrier by the modulation frequency, and a similar offset is performed at the receiver to derive a Doppler signal for heterodyning against the transponder signal.

In addition to the inherent system complexity in implementing the above-mentioned techniques, conventional systems have a further disadvantage in that the relative low-frequency Doppler signal is extracted directly at the mixer rather than from an intermediate frequency carrier. The extraction at the mixer results in a decrease in receiver sensitivity due to the high noise levels in the mixer.

SUMMARY OF THE INVENTION

A system according to the present invention for measuring relative positional characteristics, such as distance and velocity, between two objects employs a transmitting unit located on the first of the objects to generate and radiate a continuous wave carrier signal at a frequency $\omega_c$ to a transponder unit, located on the second object. The transponder unit modulates a portion of the radiated continuous wave carrier signal at a frequency $\omega_m$, thereby generating sideband carriers spaced above and below the transmitted carrier frequency by $\omega_m$ and reradiates these sidebands back to the first object. A receiving unit heterodynes the two sideband carriers with a sample of the continuous wave carrier signal from the transmitting unit, yielding an intermediate frequency signal at the transponder modulation frequency $\omega_m$. The intermediate frequency signal is amplified and detected to produce a signal proportional to $|\cos 2\omega_c T|$ where $\omega_c$ is the carrier frequency and T is the time required for the carrier signal from the transmitting unit to travel to the transponder unit. A processor unit connected to the receiving unit converts the receiving unit output signal into relative velocity and distance information. By extracting the relative low frequency Doppler information from an intermediate frequency carrier, the deleterious effects of the mixer and amplifier noise levels are substantially reduced.

DESCRIPTION OF THE DRAWINGS

The construction and operation of the apparatus according to the invention will be more fully understood from the following detailed description taken in conjunction with the accompanying drawings in which.

DETAILED DESCRIPTION OF THE INVENTION

Figure 1:
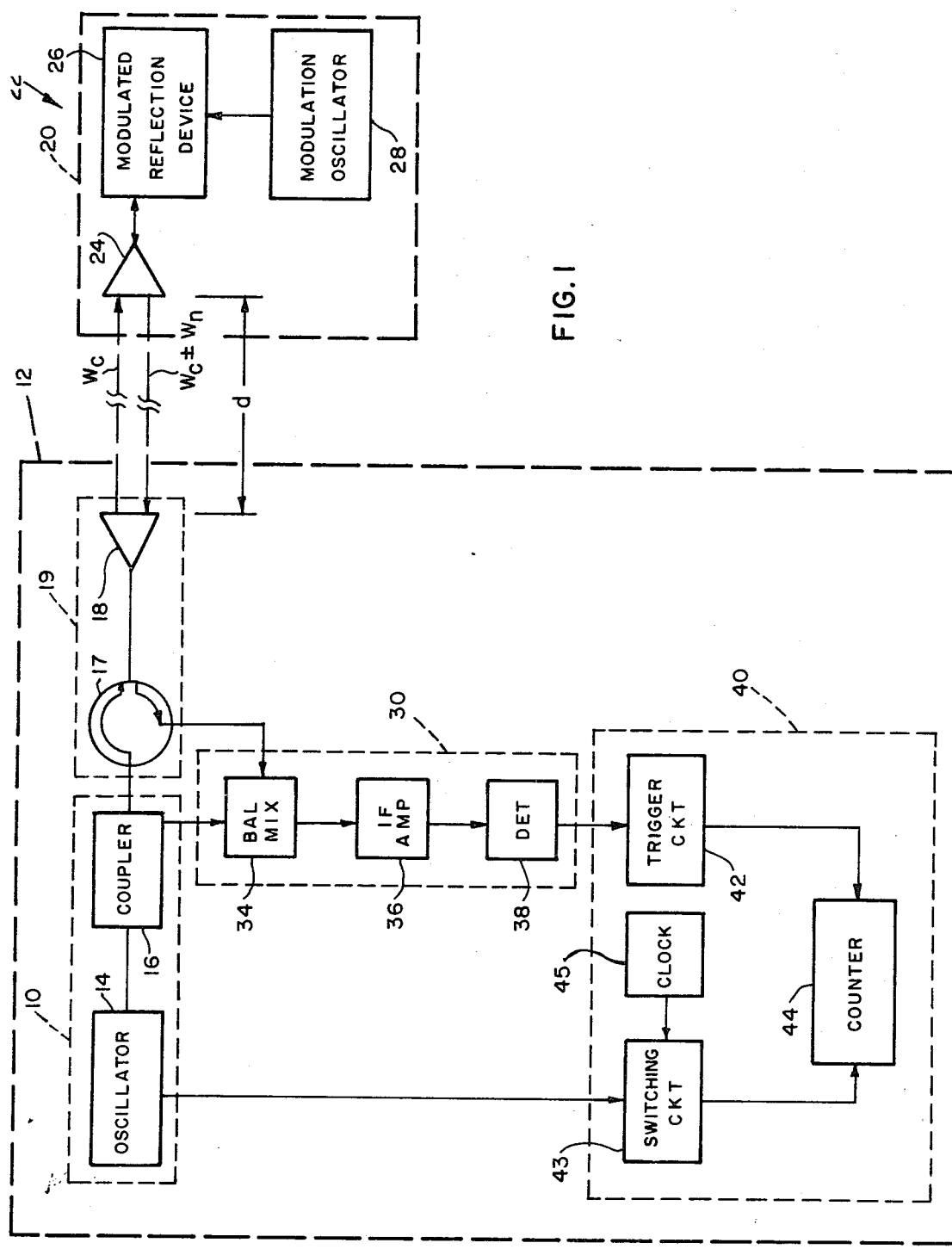
FIG. 1 is a block diagram of a preferred embodiment of the invention.

A system for measuring the relative distance and velocity between two objects according to the present invention is illustrated in the block diagram of FIG. 1. A transmitting unit 10 located on the first object 12 employs a continuous wave oscillator 14 connected to a coupler 16, for example, a directional coupler. Connected to one output part of the coupler 16 is an antenna subsystem 19 which includes a circulator 17 connected to a first antenna 18. Also connected to the antenna subsystem 19 is a receiving unit 30 which employs a series combination of a balanced mixer 34, an intermediate frequency (IF) amplifier 36 and a detector 38. The balanced mixer 34 has a second input connection from the directional coupler 16. The detector 38 is connected to a processor 40, to be discussed in detail hereinafter.

Located on the second object 22 is a transponder 20 which includes a second antenna 24 connected to a modulated reflection device 26 such as a negative resistance reflection amplifier. A modulating oscillator 28 is connected to the modulated reflection device 26.

In operation, the transmitting unit 10 employs the oscillator 14 to generate a continuous wave carrier signal having a frequency $\omega_c$. This carrier signal is directed through one port of the coupler 16 to the antenna 18 via the circulator 17. The antenna 18 in turn directs the carrier signal to a remote transponder unit 20. The transponder unit 20 converts a portion of the carrier signal to substantially equal-amplitude sidebands at frequencies of the form $\omega_c \pm k\omega_m$ where $k=1, 2, 3, \ldots$ evenly displaced in frequency from that of the carrier signal and reradiates the modulated signal comprising the sidebands $\omega_c \pm k\omega_m$, back to the first object. This reradiated signal is directed through the antenna 18 and the circulator 17 to the balanced mixer 34 where it is heterodyned with a sample of the carrier frequency signal $\omega_c$ received from the oscillator 14 via a second port of the coupler 16. The $k^{\text{th}}$ upper and lower sidebands from the transponder 20 are heterodyned to the same IF, $k\omega_m$, by the mixer 34 and amplified by the IF amplifier 36. Amplifier 36 is tuned to only one of the intermediate frequencies $k\omega_m$, usually the fundamental transponder modulation frequency, $\omega_m$. The amplified signal is envelope detected by the detector 38. The detected IF output signal thereby is a function of $|\cos 2\omega_c T|$, where T is the one-way propagation time from the object 12 to the transponder 20.

The output signal results because both the upper and lower sidebands $\omega_c+\omega_m$ and $\omega_c-\omega_m$, respectively, are accepted equally by the receiver 30 and the received signal is heterodyned with a sample of the transmitter carrier signal. If the output signal of the oscillator 14 is represented as $\cos \omega_c t$, the delayed carrier arriving at the transponder (neglecting propagation losses) is represented by $\cos \omega_c(t-T)$, and the transponder modulation process is approximated as a simple multiplication by $\cos \omega_m t$, then the signal reradiated by the transponder 20 consists of two sidebands at $\omega_c \pm \omega_m$, as expressed by Equation 1.

$$\cos \omega_c(t-T) \cos \omega_m t = \tfrac{1}{2} \cos [(\omega_c+\omega_m)t-\omega_c T] + \tfrac{1}{2} \cos [(\omega_c-\omega_m)t-\omega_c T] \quad (1)$$

After a propagation delay T, the reradiated sideband signals arrive at the receiver mixer 34 where they are heterodyned with a sample of the transmitted carrier signal, as represented by Equation 2.

$$\cos \omega_c t \begin{vmatrix} \tfrac{1}{2} \cos [(\omega_c+\omega_m)(t-T)-\omega_c T] \\ +\tfrac{1}{2} \cos [(\omega_c-\omega_m)(t-T)-\omega_c T] \end{vmatrix}$$

$$= \tfrac{1}{2} \cos \omega_m(t-T) \cos 2\omega_c T$$

$$+ \tfrac{1}{2} \cos \omega_m(t-T) \cos 2\omega_c(t-T) \quad (2)$$

The IF amplifier 36 accepts only the modulation frequency signal $\tfrac{1}{2} \cos \omega_m(t-T) \cos 2\omega_c T$. Envelope detecting the IF amplifier output signal yields the desired signal which can be represented by the expression:

$$|\cos 2\omega_c T| \quad (3)$$

Contained in the output signal of the receiver 30 as represented by Equation 3 is the relative distance and velocity information. The distance, d, between the objects 12 and 22 is determined by changing the carrier frequency and noting the magnitude of the frequency separation $\Delta\omega_c$ between successive nulls in the detector output signal. These nulls occur when the product $2\omega_c T$ is equal to $K\pi/2$, where $K=1, 3, 5, \ldots$. For a fixed propagation time, T, the frequency separation, $\Delta\omega_c$ is equal to $\pi/4T$. Since T is equal to the ratio of $c/d$, the expression for the distance d is given as follows:

$$d = \frac{c\pi}{2\Delta\omega_c} \quad (4)$$

where c is the speed of light.

The frequency separation $\Delta\omega_c$ can be determined automatically by sweeping the frequency of the carrier signal over a fixed frequency band, $\omega_1<\omega_c<\omega_2$, and counting the number of nulls in detector output signal over this fixed frequency band. This automatic range determination is performed in the processor unit 40.

One embodiment of the processor 40 employs a trigger circuit 42 connected to the output terminal of the detector 38. An integration device, such as a counter 44, has an input connection from the trigger circuit 42 and a switching circuit 43. Switching circuit 43, in turn, has input connections from the oscillator 14 and a clock 45.

In operation, the trigger circuit 42 generates a trigger pulse of substantially constant shape each time there is a null present in the amplitude of the detected IF output signal. The counter 44 then determines the total number of trigger output pulses generated in one sweep of the carrier signal from frequency $\omega_1$ to $\omega_2$. A signal from the oscillator 14 is directed through the switching circuit 43 to start the counter 44 at the beginning of the oscillator sweep, and a second signal is directed through the switching circuit 43 to reset the counter 44 when the oscillator 14 has reached the end of the sweep. Dividing the sweep width, $\omega_2-\omega_1$, by the number of nulls in the output signal of the detector 38 yields the quantity $\Delta\omega_c$, and thus the relative distance d between the objects 12 and 22 may be determined from Equation 4.

To determine the relative velocity between the two objects, the frequency $\omega_c$ of the continuous wave carrier signal is held constant.

As stated hereinabove, expression 3, the envelope of the detector 38 output signal can be expressed mathematically by $\cos |2\omega_c T|$. With $\omega_c$ held fixed, $|\cos 2\omega_c T|$ has one null for each change of $\pi/2$ $\omega_c$ in the propagation time T. If the two objects have a relative velocity v, the propagation time T changes at a rate $(v/c)$ sec/sec, so that the function $|\cos 2\omega_c T|$ has $2\omega_c v/c\pi$ nulls per second.

Therefore, by holding the frequency $\omega_c$ constant and by counting over a fixed time interval the number of nulls that occur in the detector output signal, the relative velocity between the object may be determined. In the velocity measuring mode, the switching circuit 43 directs a control signal from the clock 45 to start and stop the counter 44 and thereby establish a fixed time interval over which to count the detector nulls.

For example, if the carrier frequency $\omega_c$ is $2\pi \times 10^{10}$ rad./sec. (X-band) and the fixed time interval is 0.75 second, the counter 44 will read the absolute value of relative velocity in centimeters per second.

TRANSPONDER

As stated hereinabove, the transponder 20 accepts the continuous wave carrier signal from the transmitter 10 in the frequency band $\omega_1<\omega_c<\omega_2$ and translates a portion of it equally into the upper and lower sidebands at $\omega_c+\omega_m$ and $\omega_c-\omega_m$, respectively. Gain is clearly desirable to reduce the transmitter power required for a given range. The output power at $\omega_c+\omega_m$ and $\omega_c-\omega_m$ should be substantially equal so that the detector output signal exhibits sharp nulls, i.e., varies as $|\cos 2\omega_c T|$.

Figure 2:
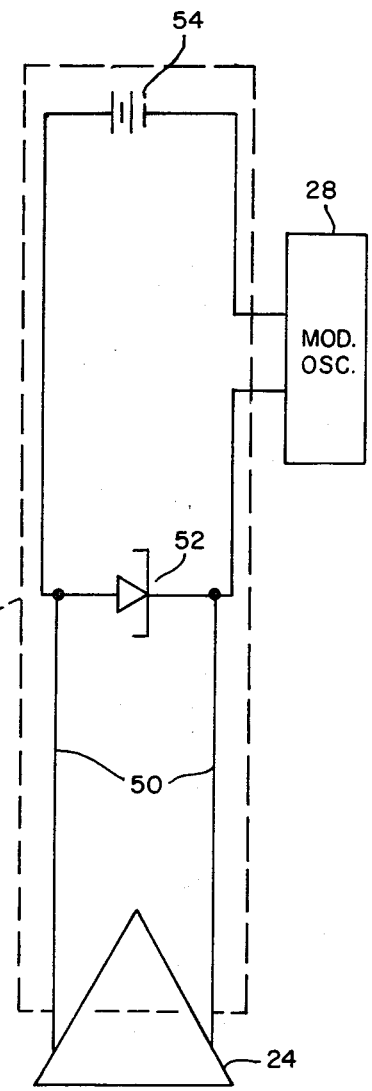
FIG. 2 is a block diagram of a transponder unit employed in the embodiment of FIG. 1.

A schematic of a modulated reflection device that can be employed in the embodiment of FIG. 1 is shown in FIG. 2. A transmission line 50 connects the antenna 24 to a device 52 with an electronically controllable radio frequency (RF) impedance, for example, a tunnel diode. The transmission line 50 is terminated by the tunnel diode 52. Also connected across the tunnel diode 52 is a series combination of a D.C. current supply 54, typically a battery and the modulation oscillator 28.

The waveforms of FIG. 3 are useful in explaining the operation of the embodiment of the transponder shown in FIG. 2. The tunnel diode 52 is biased in such a way that its small signal RF conductance $G_D$ and hence its reflection coefficient $$\frac{G_D - Y_0}{G_D + Y_0}$$

(where $Y_0$ is the characteristic admittance of the transmission line) varies over a wide range of of values at the modulation frequency rate $\omega_m$.

Figure 3A:
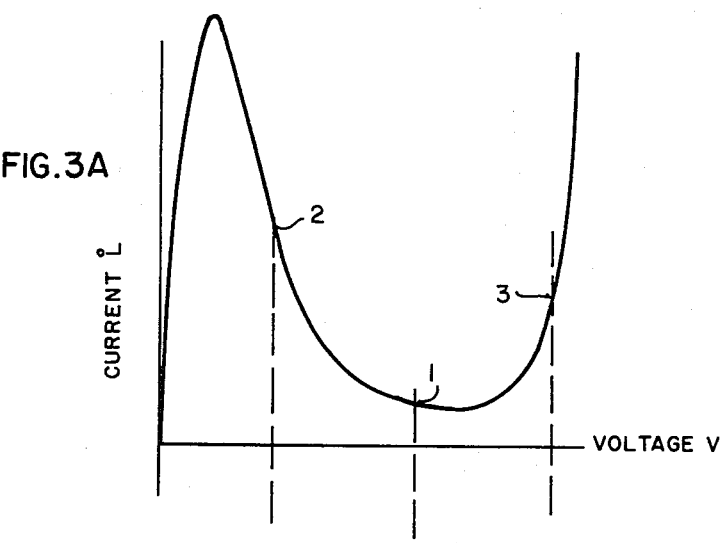
FIGS. 3A–3C are waveforms useful in explaining the operation of the transponder unit of FIG. 2.
Figure 3B:
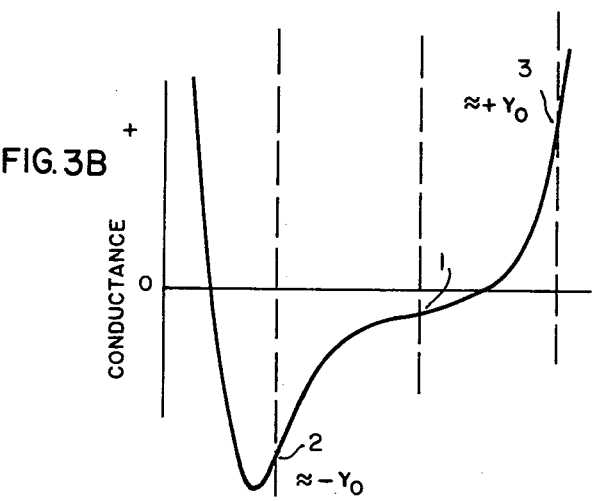
Figure 3C:
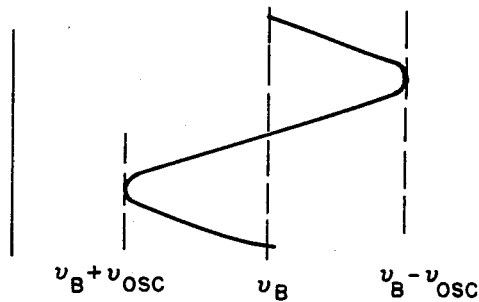

FIG. 3A is the familiar current versus voltage curve of the tunnel diode. By differentiating the current with respect to the voltage, a curve of incremental conductance, $G_D=di/dv$, can be obtained as shown in FIG. 3B. The curve of FIG. 3C is the tunnel diode bias voltage consisting of a direct voltage component $V_B$ from the D.C. source 54 and an alternating component $V_{osc}$ from the modulation oscillator 28.

During one cycle of the bias voltage, the conductance varies from near zero (point 1 on the FIGS. 3A-3B) down to $-Y_0$ (point 2) then back through zero to $+Y_0$ (point 3). Thus, the reflection coefficient (reflection gain) of the diode loaded transmission line varies from a very large value at point 2 when $G_D \approx -Y_0$ is a very low value when $G_D \approx Y_0$ at point 3. At point 3, the tunnel diode conductance acts as a matched load for the transmission line 50 and hence no incident energy from the antenna 24 is reflected. At point 2, the diode transmission line combination acts like a high gain amplifier so that a very large signal is reflected for a small input signal. Cycling the diode conductance between $-Y_0$ and $+Y_0$ at the modulation frequency, $\omega_m$, therefore, modulates the incoming signal at $\omega_m$ so that the return signal reradiated by the antenna 24 contains frequencies of the desired form $\omega_c \pm k\omega_m$ where $k=0, 1, 2, \ldots$.

While there has been shown and described what is considered a preferred embodiment of the present invention, various changes and modifications may be made therein without departing from the invention as defined in the appended claims.

What is claimed is:

1. Apparatus for measuring the relative positional characteristics between first and second objects comprising:

transmitting means located on said first object and having first and second output ports, said transmitting means being operative to supply a continuous wave carrier signal at a frequency $\omega_c$ to said first and second output ports;

first antenna means connected to the first output port of said transmitting means, said first antenna means being operable to radiate the continuous wave carrier signal of said transmitting means from said first object to said second object;

transponder means located on said second object operative to receive the continuous wave carrier signal radiated from said first antenna means and to convert a portion of said continuous wave carrier signal into two sidebands evenly spaced in frequency about the frequency of said continuous wave carrier signal and to reradiate said sidebands to said first antenna means;

receiving means having a first input connection from said first antenna means and a second input connection from the second output port of said transmitting means, said receiving means being operative to heterodyne the two sidebands from said first antenna means with the continuous wave carrier signal from said transmitting means and to provide an output signal proportional to $|\cos 2\omega_c T|$, where T is the time required for a signal to travel between said first and second objects; and processor means having an input connection connected to said receiving means, said processor means being operative to convert the output signal from the receiving means into the relative positional characteristics between said first and second objects.

2. Apparatus for measuring the relative positional characteristics between first and second objects according to claim 1 wherein said transmitting means includes:

oscillator means operative to generate a continuous wave carrier signal at a frequency $\omega_c$; and a coupling device having an input terminal and said first and second output ports, said input terminal being connected to said oscillator means, said first output port being connected to said first antenna means, and said second output port being connected to said receiving means, said coupling device being adapted to split the continuous wave carrier signal from said oscillator means between the first and second output ports of said coupling device.

3. Apparatus for measuring the relative positional characteristics between first and second objects and according to claim 1 wherein said transponder means includes:

a second antenna being operable to receive the continuous wave carrier signal radiated from said first antenna means;

a modulation oscillator operative to generate a predetermined modulation signal; and a modulated reflection device having input connections from said second antenna and said modulation oscillator, said modulated reflection device being operative to combine the modulation signal from said modulation oscillator with said continuous wave carrier signal to generate equal sidebands, and to reflect said equal sidebands back to said second antenna for reradiation back to said first antenna means.

4. Apparatus for measuring the relative positional characteristics between first and second objects according to claim 3 wherein said modulated reflection device includes:

a transmission line having one end connected to said second antenna;

a variable impedance circuit having a first input connection from the other end of said transmission line and a second input connection from said modulation oscillator, said variable impedance circuit being operative in response to the modulation signal to change the impedance at the modulation signal frequency whereby a signal directed along said transmission line from said one end is modulated by the change in impedance and the resultant modulated signal is reflected back along said transmission line to said second antenna.

5. Apparatus for measuring the relative positional characteristics between first and second objects according to claim 1 wherein said receiving means includes:

a balanced mixer having a first input connection from said first antenna means and a second input connection from the second output port of said transmitting means, said balanced mixer being operable to heterodyne the continuous wave carrier signal from said transmitting means with both sidebands received from said transponder means to provide an output signal having an intermediate frequency equal to the frequency spacing between the carrier signal and the two sidebands;

an intermediate frequency amplifier having an input connection from said balanced mixer, said intermediate frequency amplifier being operative to amplify the output signal from said balanced mixer; and detector means having an input connection from said intermediate frequency amplifier, said detector means being operative to detect the output signal from said intermediate frequency amplifier and thereby provide an output signal proportional to $|\cos 2\omega_c T|$.

6. Apparatus for measuring the relative positional characteristics between first and second objects according to claim 1 wherein said continuous wave carrier signal is swept between two fixed frequencies and wherein said processor means includes:

a switching circuit having a first input connection from said transmitting means and an output terminal, said switching circuit being operative to supply a first signal to said output terminal when said continuous wave carrier is at the first of said two fixed frequencies and to supply a second signal to said output terminal when said continuous wave carrier signal is at the second of said two fixed frequencies;

a trigger circuit having an input connection from said receiving means, said trigger circuit being operative to generate a trigger pulse each time the amplitude of the receiving means output signal, which is proportional to $|\cos 2\omega_c T|$, goes through a null; and integration means having a first input connection from the output terminal of said switching means and a second input connection from said trigger circuit, said integration device being operative to count the number of trigger pulses from said trigger circuit occurring between the first and second output signals from said switching circuit.

7. Apparatus for measuring the relative positional characteristics between first and second objects according to claim 1 wherein said processor means includes:

a clock means operative to generate first and second pulses separated by a fixed time interval;

a trigger circuit having an input connection from said receiving means, said trigger circuit being operative to generate a trigger pulse each time the amplitude of the receiving means output signal, which is proportional to $|\cos 2\omega_c T|$, goes through a null; and integration means having a first input connection from said clock means and a second input connection from said trigger circuit, said integration means being operative to count the number of trigger pulses from said trigger circuit occurring between said first and second pulses from said clock.

8. Apparatus for measuring the relative positional characteristics between first and second objects according to claim 2 wherein said transponder means includes:
   a second antenna being operable to receive the continuous wave carrier signal radiated from said first antenna means;
   a modulation oscillator operative to generate a predetermined modulation signal; and
   a modulated reflection device having input connections from said second antenna and said modulation oscillator, said modulated reflection device being operative to combine the modulation signal from said modulation oscillator with said continuous wave carrier signal to generate substantially equal sidebands, and to reflect said equal sidebands back to said second antenna for reradiation back to said first antenna means.

9. Apparatus for measuring the relative positional characteristics between first and second objects according to claim wherein said modulated reflection device includes:
   a transmission line having one end connected to said second antenna;
   a variable impedance circuit having a first input connection from the other end of said transmission line and a second input connection from said modulation oscillator, said variable impedance circuit being operative in response to the modulation signal to change the impedance at the modulation signal frequency whereby a signal directed along said transmission line from said one end is modulated by the change in impedance and the resultant modulated signal is reflected back along said transmission line to said second antenna.

10. Apparatus for measuring the relative positional characteristics between first and second objects according to claim 9 wherein said receiving means includes:
    a balanced mixer having a first input connection from said first antenna means and a second input connection from the second output port of said transmitting means, said balanced mixer being operable to heterodyne the continuous wave carrier signal from said transmitting means with both sidebands received from said transponder means to provide an output signal having an intermediate frequency equal to the frequency spacing between the carrier signal and the two sidebands;
    an intermediate frequency amplifier having an input connection from said balanced mixer, said intermediate frequency amplifier being operative to amplify the output signal from said balanced mixer; and
    detector means having an input connection from said intermediate frequency amplifier, said detector means being operative to detect the output signal from said intermediate frequency amplifier and thereby provide an output signal proportional to $|\cos 2\omega_c T|$.

11. Apparatus for measuring the relative positional characteristics between first and second objects according to claim 10 wherein said continuous wave carrier signal is swept between two fixed frequencies and wherein said processor means includes:
    a switching circuit having a first input connection from said transmitting means and an output terminal, said switching circuit being operative to supply a first signal to said output terminal when said continuous wave carrier is at the first of said two fixed frequencies and to supply a second signal to said output terminal when said continuous wave carrier signal is at the second of said two fixed frequencies;
    a trigger circuit having an input connection from said receiving means, said trigger circuit being operative to generate a trgger pulse each time the amplitude of the receiving means output signal, which is proportional to $|\cos 2\omega_c T|$, goes through a null; and
    integration means having a first input connection from the output terminal of said switching means and a second input connection from said trigger circuit, said integration device being operative to count the number of trigger pulses from said trigger circuit occurring between the first and second output signals from said switching circuit.

12. Apparatus for measuring the relative positional characteristics between first and second objects according to claim 11 wherein said processor means includes:
    a clock means operative to generate first and second pulses separated by a fixed time interval;
    a trigger circuit having an input connection from said receiving means, said trigger circuit being operative to generate a trigger pulse each time the amplitude of the receiving means output signal, which is proportional to $|\cos 2\omega_c T|$, goes through a null; and
    integration means having a first input connection from said clock means and a second input connection from said trigger circuit, said integration means being operative to count the number of trigger pulses from said trigger circuit occurring between said first and second pulses from said clock.

References Cited

UNITED STATES PATENTS

| | | | |
|---|---|---|---|
| 2,996,708 | 8/1961 | Tollefson | 343—8 |
| 3,108,275 | 10/1963 | Chisholm | 343—6.5 X |
| 3,115,627 | 12/1963 | Pierce | 343—8 |
| 3,214,756 | 10/1965 | Goldberg | 343—14 |
| 3,257,659 | 6/1966 | Siegel. | |

OTHER REFERENCES

"Encyclopedic Dictionary of Electronics and Nuclear Engineering" by R. I. Sarbaccher, Prentice-Hall, Inc., Englewood Cliffs, N.J., 1959, p. 1153.

RICHARD A. FARLEY, Primary Examiner

M. F. HUBLER, Assistant Examiner

U.S. Cl. X.R.

343—6.8, 8, 14